Nov. 23, 1943.  W. W. WILLIAMS  2,334,975
AIRCRAFT
Filed Nov. 13, 1941

INVENTOR
WILLIAM WARREN WILLIAMS
BY
Bean, Brooks, Buckley + Bean
ATTORNEYS

Patented Nov. 23, 1943

2,334,975

UNITED STATES PATENT OFFICE 2,334,975

AIRCRAFT

William Warren Williams, Kenmore, N. Y., assignor to Bell Aircraft Corporation, Buffalo, N. Y.

Application November 13, 1941, Serial No. 418,911

10 Claims. (Cl. 244—42)

This invention relates to aircraft, and more particularly to wing lift increasing devices for high speed airplanes.

One widely used form of wing lift increasing device is the so-called slotted flap arrangement wherein the wing flap is so positioned relative to the fixed wing that a slot is formed therebetween for directing flow of air from the lower surface of the airfoil through the structure for subsequent discharge at the upper surface of the airfoil in the direction of and substantially parallel to the airstream at the upper surface of the flap. Various devices have been previously employed in connection with slotted flap arrangements for controlling the flow of air through the slot under different conditions of operations. For example, one such arrangement is disclosed in Patent 2,117,607 to R. W. Griswold, II; but the present invention is concerned with providing different results and improvements over such devices of the prior art.

One of the objects of the present invention is to provide an improved wing lift control device. Another object of the invention is to provide a novel slotted flap arrangement for use in connection with wings of high speed airplanes to provide improved performance characteristics. Another object of the invention is to provide a novel slotted flap device which is adapted to function in connection with high speed airplanes in an improved manner under fully deflected and partially deflected flap conditions. Another object of the invention is to provide a device for the purpose stated which is of improved structural form and adapted to be manufactured as an integral sub-assembly unit for subsequent assembly in combination with main wing and flap structures in an improved manner. Other objects and advantages of the invention will appear from the specification hereinafter.

Figure 1:
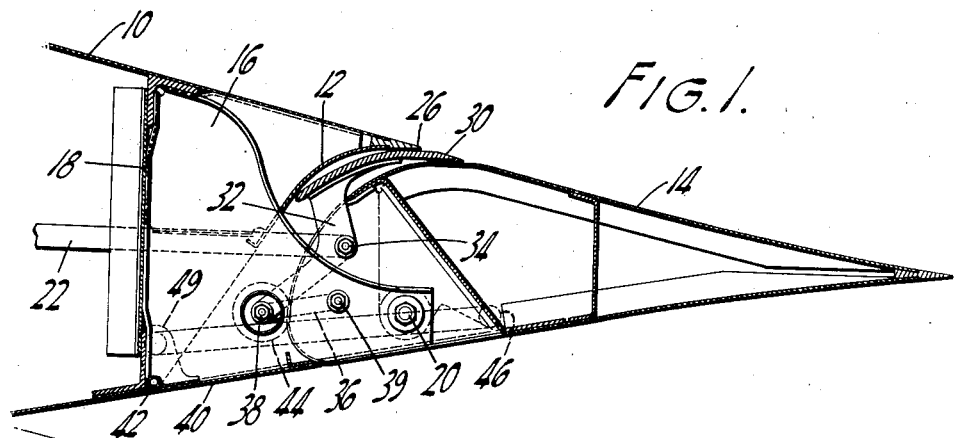
Fig. 1 is a chord-wise fragmentary sectional view of the trailing edge portion of an airplane wing and slotted flap mechanism of the present invention.

The invention is illustrated in connection with a fixed airplane wing structure designated at 10 which terminates at its trailing edge portion in a rearwardly and upwardly directed curved surface 12 overlying the nose portion of the wing flap 14. Bracket plates 16 extend rearwardly from a wing spar member 18 at spaced intervals spanwise of the wing so as to provide bearing means for support of the flap 14 upon the wing section 10 through means of pivotal connections 20. A push-pull control member 22 is pivotally connected to the flap, and thus it will be understood that the flap is arranged to be actuated pivotally relative to the wing 10 so as to be moved between the normal trailing position of Fig. 1 thereof and the deflected positions of Figs. 2 and 3 thereof in response to pilot control operations.

It will be noted that the elements of the mechanism are so proportioned and arranged that the upper trailing edge portion 26 of the main wing structure is forwardly spaced from the adjacent upper surface portion of the flap 14 in all positions of flap adjustment relative to the main wing; and that the nose of the flap 14 is arranged to clear the rear surface plate 12 of the main wing so as to provide an airflow slot of substantial width therebetween.

A slot control vane 30 of curved plate form is disposed within the upper end portion of the air slot and is mounted upon a series of bell cranks 32 spaced spanwise of the flap and pivotally connected thereto by means of pins 34. The lower ends of the bell cranks 32 are pivotally connected to corresponding links 36 by means of pins 38; and the links 36 are pivotally connected at their opposite ends to stationary bracket portions extending rearwardly from the main wing 10, as at 39. The vane 30 and the bell crank structures 32 are so formed and arranged that the vane 30 extends between the upper trailing edge portion 26 of the wing and the upper surface portion of the flap 14 so as to close the air slot and to provide a smoothly continuous upper surface form for the combination wing and flap unit whenever the flap 14 is in its normal or trailing position as illustrated by Fig. 1. Also, by reason of the arcuate sectional form of the vane 30 as shown, it is adapted to similarly close the upper end of the air slot between the fixed wing and the flap 14 whenever the flap is in a partly deflected position as within the range of the positions of Figs. 1 and 2.

Figure 2:
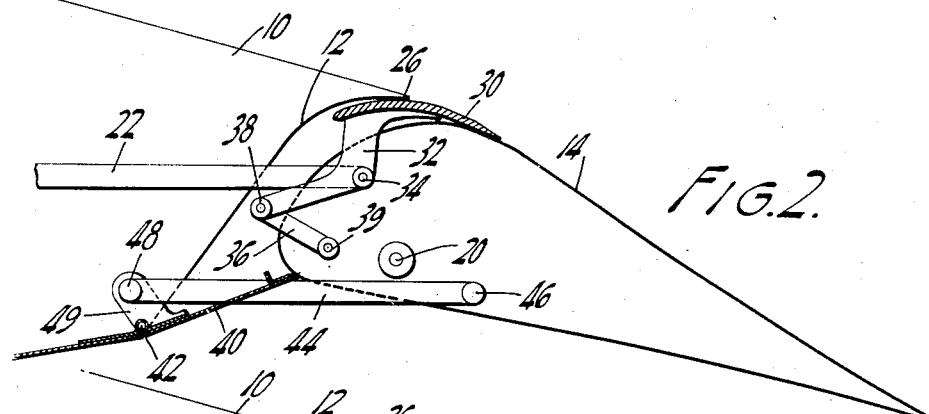
Fig. 2 is a partly schematic view similar to Fig. 1, showing the flap in its partly deflected maneuvering, climbing, or take-off position.
Figure 3:
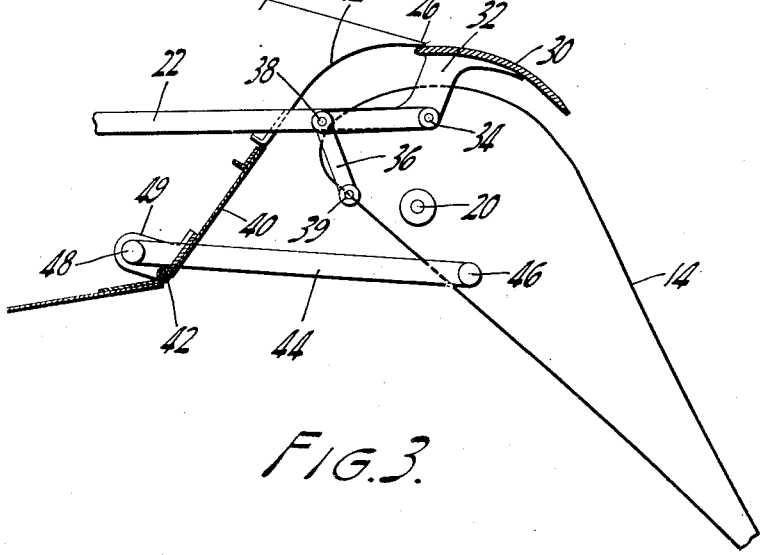
Fig. 3 is a view corresponding to Fig. 2 of the flap in fully deflected or high lift and high drag or landing position.

Thus, it will be understood that the flap 14 is adapted to be adjusted downwardly relative to the fixed wing 10, as to the position of Fig. 2, to provide wing lift increase effects without opening of the slot between the wing and the flap. However, the vane and bell crank assembly is so proportioned and arranged that whenever the flap is moved into the range of its so-called fully deflected position, as illustrated by Fig. 3, the trailing edge portion of the vane 30 will have been automatically disposed in spaced relation with respect to the nose portion of the flap while its leading edge portion remains in substantial registry with extreme trailing edge portion 26 of the main wing. Thus, as illustrated by Fig. 3, in this position of flap adjustment the vane 30 is disposed in substantially smooth continuation with respect to the upper surface of the main wing 10 but in spaced relation with respect to the flap 14 so as to simultaneously provide opening of the air flow slot between the wing and the flap and to provide a downwardly curving deflector device for controlling the air flowing through the slot so as to be forcibly directed downwardly against the downwardly sloping upper surface portion of the flap 14. It will be understood that this mode of operation and adjustment of the vane attitude relative to the main wing and flap structures is obtained automatically by reason of the operation of the linkage system comprising the bell cranks 32 and the links 36, as a result of pilot controlled flap adjustments relative to the main wing.

A door for sealing the air slot at the lower surface of the wing-flap airfoil is provided at 40 in the form of a sheet metal plate hinged to the main wing structure at 42 and arranged to be controlled automatically by means of a link 44 which pivotally connects to the flap 14 at a position 46 offset from the line of the flap pivot 20. At its other end the link 44 pivotally connects at 48 to a horn 49 extending laterally from the sealing door 40; and the operative elements of the mechanism are so proportioned and arranged that when the flap is in normal or trailing position, as in Fig. 1, the door 40 is disposed in an attitude of smooth continuation with respect to the under surface of the main wing 10, and extends therefrom into close alignment with the lower surface portion of the flap nose portion. Thus, the effect of a solid wing with uninterrupted upper and lower surfaces is provided. Consequently, when the flap is in normal attitude relative to the fixed wing structure the combination wing and flap airfoil structure is of ideal aerodynamic form.

The sealing door link control system is so arranged, however, that upon deflection of the flap to a position below the normal trailing position of Fig. 1 the sealing door 40 will be automatically pivoted upwardly. The parts of the mechanism are so proportioned and arranged that during initial flap deflection adjustments, as within the range of movements between the positions of Figs. 1 and 2 for example, the trailing edge portion of the sealing door 40 will move upwardly while remaining in contiguous relation with respect to the nose portion of the flap 14. Thus, the air slot between the flap 14 and the main wing 10 will remain closed by the sealing door 40 throughout positional adjustments of the flap 14 between the positions thereof of Figs. 1 and 2; and the flap 14 is therefore adapted to be deflected as to the position of Fig. 2 to provide the effect of a partially deflected flap of the non-slotted type. However, upon deflection of the flap 14 to positions below the position of Fig. 2, as towards the position of Fig. 3, the sealing door 40 will be actuated to swing forwardly into smooth alignment with the lower edge of the rear wall 12 of the main wing, whereby a smooth walled air flow slot between the wing and the flap is uncovered at the under surface of the airfoil. It will be understood, of course, that the link 44 may be upwardly arched instead of being of straight-line form as shown, so as to avoid its projecting downwardly into the airstream below the airfoil when the mechanism is in the position of Fig. 2.

Thus, under this latter condition of flap adjustment the slot is open at both ends, and a slotted flap effect is provided while the length of the slot channel is automatically increased with respect to the upper surface of the flap 14 by reason of the disposition of the vane 30 as explained hereinabove. Consequently, the device provides a higher lift coefficient and lower drag, and better control characteristics due to a decreased tendency to stall, as compared with slotted flap arrangements of the prior art.

It will be understood that the mechanism of the invention functions in novel manner to provide in connection with both normal trailing and partially deflected flap positions a closed slot effect whereby both the upper and lower surfaces of the combination wing and flap airfoil are substantially uninterrupted and of smoothly continuing form. Thus, the invention provides particular features and advantages when used in connection with laminar flow type airfoils as on fast military airplanes or the like wherein at positions of partial flap deflection it is of utmost importance to avoid roughness in the airfoil surfaces and to maintain a closed slot effect at both the top and bottom surfaces of the airfoil. It is well known that the efficacy of laminar flow type airfoils is especially vulnerable to roughness at the airfoil surfaces; and therefore, since the arrangement of the invention eliminates the gaps which usually exist in connection with slotted flap airfoil arrangements even under flap normal and only partially deflected conditions, the invention provides features and advantages of utmost importance when used in connection with such airfoil types.

Although only one form of the invention has been shown and described in detail, it will be apparent to those skilled in the art that the invention is not so limited but that various changes may be made therein without departing from the spirit of the invention or the scope of the appended claims.

I claim:

1. A wing lift control device comprising, a movable flap constituting a relatively hinged part of the trailing edge portion of a fixed wing portion and spaced from said fixed wing portion to provide an air flow slot therebetween, said flap being adjustable relative to said fixed wing portion to a partially deflected high lift low drag position and to a fully deflected high lift high drag position, a slot closure plate pivotally mounted upon said flap to extend within said slot, control means coupled to said plate and adapted to operate to automatically cause said plate to be pivotally regulated relative to said flap to be disposed so as to substantially close said slot when said flap is in either normal trailing position or in said high lift low drag position and to be in slot-open position when said flap is adjusted to said fully deflected high-lift high-drag position.

2. A wing lift control device comprising, a movable flap constituting a relatively hinged part of the trailing edge portion of a fixed wing portion and spaced from said fixed wing portion to provide an air flow slot therebetween, said flap being adjustable relative to said fixed wing portion to a partially deflected high lift low drag position and to a fully deflected high lift high drag position, a slot closure plate pivotally mounted upon said flap to extend within said slot, link means coupled to said fixed wing portion and to said plate and adapted to operate to automatically cause said plate to be pivotally regulated relative to said flap so as to be disposed so as to substantially close said slot when said flap is in either normal trailing position or in said high lift low drag position relative to said fixed wing portion and to be in slot-open position when said flap is adjusted to said fully deflected position relative to said fixed wing portion.

3. A wing lift control device comprising, a movable flap constituting a relatively hinged part of the trailing edge portion of a fixed wing portion and spaced from said fixed wing portion to provide an air flow slot therebetween throughout all phases of flap movement, a slot closure plate pivotally mounted upon said flap to extend within said slot and to substantially close said slot at the upper end thereof when said flap is in normal trailing or neutral position relative to said fixed wing portion, control means coupled to said plate and adapted to operate in response to adjustments of said flap to a deflected position away from normal trailing or neutral position to automatically cause said plate to pivot to open said slot and to assume a position spaced from and substantially parallel to the adjacent surface portion of said flap.

4. A wing lift control device comprising, a movable flap constituting a relatively hinged part of the trailing edge portion of a fixed wing portion and spaced from said fixed wing portion to provide an air flow slot therebetween, said flap being adjustable relative to said fixed wing portion to a partially deflected high lift low drag position and to a fully deflected high lift high drag position, a slot closure plate pivotally mounted upon said flap to extend within said slot, means coupled to said plate and adapted to operate to automatically cause said plate to be pivotally regulated relative to said flap to be disposed so as to substantially close said slot at the upper end thereof when said flap is in either normal trailing position or in said high lift low drag position and to be in slot-open position when said flap is adjusted to said fully deflected position relative to said fixed wing portion.

5. A wing lift control device comprising, a movable flap constituting a relatively hinged portion of the trailing edge part of a fixed wing portion and spaced from said fixed wing portion to provide an air flow slot therebetween, a pair of slot closure plates each of which are mounted upon one of said wing portions and extend within said slot at the upper and lower ends thereof respectively, crank means coupled to said plates and to relatively moving other of said wing portions and adapted to operate to automatically cause said plates to pivot relative to said flap so as to be disposed so as to substantially close said slot when said flap is in normal trailing position relative to said fixed wing portion and to be in slot-open position when said flap is adjusted to deflected position relative to said fixed wing portion.

6. A slotted wing-flap airfoil device comprising a fixed main wing portion and a movable flap having a rounded nose portion and being pivotally mounted upon a bracket device extending rearwardly from said main wing portion to provide an air flow slot therebetween leading from the under surface of said airfoil for discharge at the upper surface thereof, a slot control door at the lower end portion of said slot comprising a plate hinged to said fixed wing portion to extend therefrom in smooth line continuation form between said fixed wing portion and said flap and into substantially tangential relation with respect to said flap nose portion at a position thereon below a line extending between the pivot axes of said flap and said door to provide a faired line undersurface throughout said airfoil structure when said flap is in normal trailing attitude relative to said fixed wing portion, and link means interconnecting said door and said flap in a direction eccentrically of the axes of pivoting of said flap and of said door and adapted to automatically operate to pivot said door upwardly when said flap is deflected downwardly relative to said fixed wing portion in such manner that during initial deflection movements of said flap as to high lift low drag positions said door extending end portion substantially abuts said flap nose portion so as to maintain said slot in substantially closed condition at the lower end portion thereof and to retreat from flap abutting position upon movement of said flap to high lift high drag deflected position so as to uncover said slot lower end portion.

7. A slotted wing-flap air foil device comprising a fixed main wing portion and a movable flap having a rounded nose portion and being pivotally mounted upon a bracket device extending rearwardly from said main wing portion to provide an air flow slot therebetween leading from the under surface of said airfoil for discharge at the upper surface thereof, a slot control door at the lower end portion of said slot comprising a plate hinged to said fixed wing portion to extend therefrom in smooth line continuation form between said fixed wing portion and said flap and into tangential relation with respect to said flap nose portion to provide a straight line undersurface throughout said air foil structure when said flap is in normal trailing attitude relative to said fixed wing portion, link means interconnecting said door and said flap so as to pivot said door upwardly when said flap is deflected downwardly relative to said fixed wing portion in such manner that during initial deflection movements of said flap as to high lift low drag positions said door extending end portion follows said flap nose portion in contiguous relation so as to maintain said slot in substantially closed condition at the lower end portion thereof and to retreat from flap contiguous position upon movement of said flap to high lift high drag deflected position so as to uncover said slot lower end portion, and a slot control plate pivotally mounted upon said flap at the upper end of said slot, means coupled to said plate for causing the latter to pivot relative to said flap so as to be disposed to substantially close said slot when said flap is in normal trailing position and in said high lift low drag position relative to said fixed wing portion and to be in slot-open position when said flap is adjusted to said fully deflected position relative to said fixed wing portion.

8. A slotted wing-flap airfoil device comprising a fixed main wing portion and a movable flap pivotally mounted upon a bracket device extending rearwardly from said main wing portion to provide an air flow slot therebetween leading from the under surface of said airfoil for discharge at the upper surface thereof, a slot control door at the lower end portion of said slot comprising a plate hinged to said fixed wing portion to extend therefrom into substantially tangential relation with respect to said flap and in smooth line continuation form between said fixed wing portion and said flap to provide a faired undersurface throughout said airfoil structure below a line extending through the pivot axes of said flap and said door when said flap is in normal trailing attitude relative to said fixed wing portion, link means interconnecting said door and said flap and adapted to automatically operate to pivot said door upwardly when said flap is pivoted downwardly relative to said fixed wing portion in such manner that during initial deflection of said flap to high lift low drag positions said door extending end portion moves contiguously of said flap so as to maintain said slot in substantially closed condition at the lower end portion thereof and to retreat from flap contiguous position upon movement of said flap to high lift high drag deflected position so as to open said slot lower end portion.

9. A slotted wing-flap airfoil device comprising a fixed main wing portion and a movable flap pivotally mounted upon a bracket device extending rearwardly from said main wing portion to provide an air flow slot therebetween leading from the under surface of said airfoil for discharge at the upper surface thereof, a slot control door at the lower end portion of said slot comprising a plate hinged to said fixed wing portion to extend therefrom into tangential relation with respect to said flap and in smooth line continuation form between said fixed wing portion and said flap to provide a faired undersurface throughout said airfoil structure when said flap is in normal trailing attitude relative to said fixed wing portion, link means interconnecting said door and said flap so as to pivot said door upwardly when said flap is pivoted downwardly relative to said fixed wing portion in such manner that during initial deflection of said flap to high lift low drag positions said door extending end portion moves contiguously of said flap so as to maintain said slot in substantially closed condition at the lower end portion thereof and to retreat from flap contiguous position upon movement of said flap to high lift high drag deflected position so as to open said slot lower end portion, and a slot control plate pivotally mounted upon said flap at the upper end of said slot, means coupled to said plate for causing the latter to pivot relative to said flap so as to be disposed so as to substantially close said slot when said flap is in normal trailing position and in said high lift low drag position relative to said fixed wing portion and to be in slot-open position when said flap is adjusted to said fully deflected position relative to said fixed wing portion.

10. A wing lift control device comprising, a manually operable flap constituting a relatively hinged portion of the trailing edge part of a fixed wing portion and spaced from said fixed wing portion to provide an air flow slot therebetween, said flap being adjustable relative to said fixed wing portion to a partially deflected high lift low drag position and to a fully deflected high lift high drag position, a pair of slot closure plates extending within said slot at the upper and lower ends thereof respectively, means coupled to said plates and to relatively moving other of said wing portions and adapted to operate to automatically cause said plates to pivot relative to said flap so as to be disposed so as to close said slot when said flap is in normal trailing position and in said high lift low drag position relative to said fixed wing portion and in slot-open position when said flap is adjusted to said fully deflected position relative to said fixed wing portion.

WILLIAM WARREN WILLIAMS.